D. BICKFORD.
CARBURETERS.
No. 182,345. Patented Sept. 19, 1876.
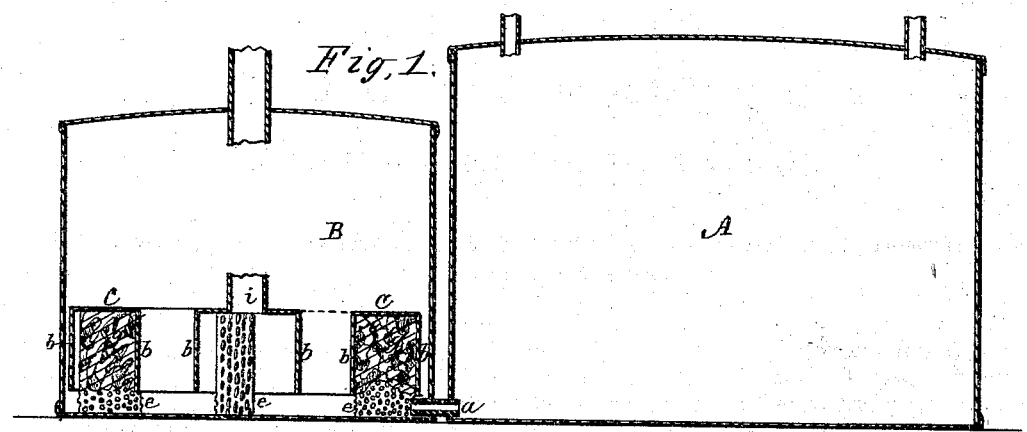
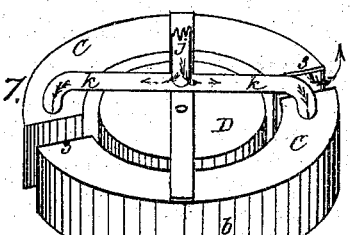
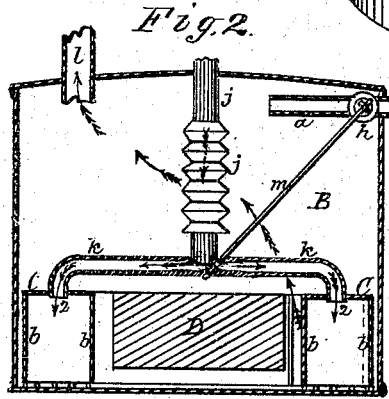
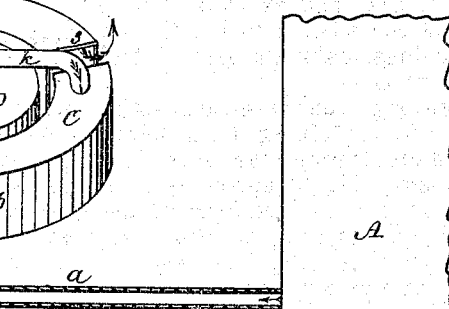
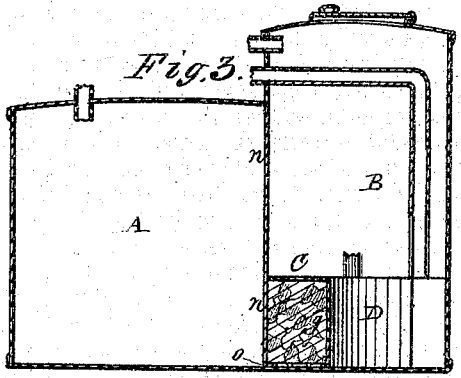
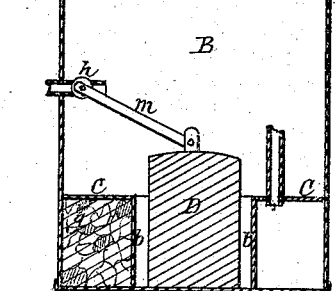
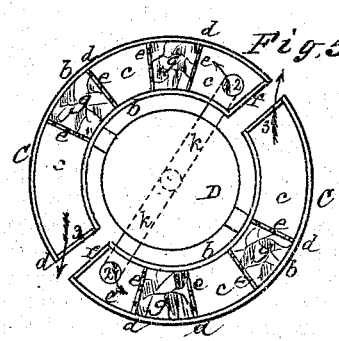
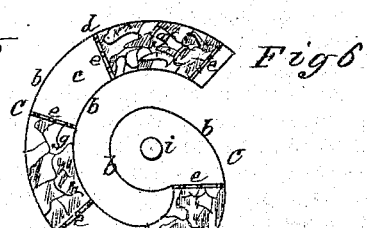
Witnesses,
W. B. Masson
Edmund Masson
Inventor
Dana Bickford,
By atty A. B. Stoughton.
N. PETERS, PHOTO-LITHOGRAPHER, WASHINGTON, D. C.

UNITED STATES PATENT OFFICE.

DANA BICKFORD, OF NEW YORK, N. Y.

IMPROVEMENT IN CARBURETERS.

Specification forming part of Letters Patent No. 182,345, dated September 19, 1876; application filed November 18, 1875.

*To all whom it may concern:*

Be it known that I, DANA BICKFORD, of the city, county, and State of New York, have invented certain new and useful Improvements in Carbureters; and that the following is a full, clear, and exact description of the same, reference being had to the accompanying drawings, making a part of this specification, in which—

Figure 1 represents a vertical section through the tank for containing the carbureting material, and also through the saturating tank and mechanism. Fig. 2 represents a vertical section through a modified form of the containing and the saturating tanks or chambers and their appliances. Fig. 3 represents a vertical section through a modified form of the tanks or chambers contained, substantially, one within the other. Fig. 4 represents a vertical transverse section through the saturating-chamber, showing the float and its appliances, and the absorbent material in the chamber, as in Fig. 3. Fig. 5 represents a plan of the under or chambered end of the saturator, with the absorbent material in place. Fig. 6 represents a plan of the under or chambered end of the saturator in spiral form instead of having concentric partitions, as in Fig. 5. Fig. 7 represents, in perspective, a top plan of the saturating apparatus, as shown in Fig. 5.

My invention consists in the combination, in carbureting-machines, of the containing-tank and the saturating apparatus and appliances for admitting and regulating the inflow and outflow of the carbureted gas or air, and for regulating the supply of saturating material, as will be explained.

A, Figs. 1 and 2, represents tanks for containing the saturating material, which tanks are placed external to the tanks B, which contain the saturating apparatus, and connected thereto by a pipe, $a$. The saturating apparatus C is seen at Figs. 5, 6, and 7, separated from its tank, and in working position, as seen at Figs. 1, 2, 3, 4, which are mere modifications of each other. The saturating apparatus C is of either cylindrical form, as seen in Figs. 5 and 7; or it may be of a spiral form, as in Fig. 6. In either case its under side has two walls, $b\ b$, of a form corresponding to either the circular or spiral, as the case may be, forming a chamber or passage, $c$, divided by radial walls $d$, in which those $e$ are of perforated metal or wire-gauze, and those $f$, in Fig. 5, are solid, while all of the radial walls, as in Fig. 6, may be perforated or of wire-gauze. In the alternate chambers formed on the saturator, by the radial walls, sponge $g$ or other absorbent material is placed. To the saturator C, as at Figs. 2, 4, and 5, there is connected or combined a float, D, which, as at Fig. 2, serves two purposes, viz., to keep the saturator at or near the surface of the saturating material, and also to close or open the cock $h$, to regulate the supply of said material. In Fig. 4 the float simply opens and closes the supply-cock $h$. The saturator C, as seen in Fig. 1, is of the form shown at Fig. 6. The gas or air to be saturated enters the saturator at $i$ and, passing through the different sections of saturated sponges $g$, or other absorbent, becomes highly surcharged with the hydrocarbon, and may pass out through a pipe in the cover of the chamber B to the burners or gasometer.

At Fig. 2 the same general plan is followed out. The gas or air to be carbureted passes down through an elastic pipe, $j$, made bellows-fashion, thence through the branch pipes $k\ k$, and through the openings 2 2, into the saturator, as shown at Fig. 5, where, as seen by the arrows, the gas or air passing through the saturated sponges escapes at two points, 3 3, and thence out at $l$, to be used or stored. When the float D rises beyond a given point, the rod or link $m$ closes the supply pipe or cock, and, per contra, when the liquid gets too low in the chamber it opens said supply-cock. The pipe $j$, made as shown and of leather, works well, but other flexible material may be used.

At Fig. 3 I have shown the saturating apparatus C as being inside of the supply-tank A. This, by some, is regarded as dangerous, and the plans shown at Fig. 1 may be used—the air-tight tanks being external to the saturator and, in one case, quite remote from it. In Figs. 3 and 1 the carbureting material may pass from the chamber A under the wall $n$, as at $o$ in Fig. 3, or through $a$, as shown in Fig. 1, the current of gas or air and the consumption of the material in C inducing the carbureting material to flow in in sufficient quantity to keep up the supply.

At Fig. 4 is seen, also, the saturator C inside of the chamber B, which is also the saturating chamber in this case. The chambers A are air-tight, or practically so. Where they are shown as having inlet and exit pipes, it is understood that such pipes are commanded by cocks, to close or open them when necessary to do so.

The section at Fig. 4 represents the chamber B and saturator C as removed from the tank A, it being shown in position in Fig. 3. This tank A can be at a distance if required. The liquid entering through the pipe h is regulated by the float D. The series of chambers with the perforated walls and the absorbent arranged in said chambers prevent the escape of the gas or air until it is thoroughly surcharged with the carbureting material.

Having thus fully described my invention, what I claim therein as new, and desire to secure by Letters Patent, is—

1. In combination with the float D and chamber B, the saturator C, as shown in Figs. 2, 5, and 7, having outside walls b b, sponge chambers and passages c, radial walls d, and branch pipes k, all constructed and arranged substantially as shown and described.

2. In combination with the carbureter supply-pipe, the supply-cock h, operated by a floating saturator, C, having outside walls b b, sponge chamber and passage c, radial walls d, and branch pipes k, all constructed and arranged substantially as shown and described.

3. In combination with the floating saturator C, having outside walls b b, sponge chamber and passage c, radial walls d, and branch pipes k, all constructed substantially as shown and described, the flexible inlet-pipe j, constructed substantially as and for the purpose set forth.

DANA BICKFORD.

Witnesses:
A. B. STOUGHTON,
EDMUND MASSON.